United States Patent [19]
Grimaud

[11] Patent Number: 5,347,594
[45] Date of Patent: Sep. 13, 1994

[54] METHOD OF IMAGE ANALYSIS
[75] Inventor: Michel Grimaud, Paris, France
[73] Assignee: General Electric CGR, Issy Les Moulineaux, France
[21] Appl. No.: 988,099
[22] Filed: Dec. 10, 1992
[30] Foreign Application Priority Data
  Dec. 10, 1991 [FR] France .................. 91 15308
[51] Int. Cl.$^5$ ............................. G06K 9/00
[52] U.S. Cl. .......................... 382/29; 382/53; 382/54
[58] Field of Search ............. 382/50, 53, 22, 29, 382/9, 54; 348/252, 421, 625, 627

[56] References Cited
FOREIGN PATENT DOCUMENTS 2656106 6/1991 France .
60-118979 6/1985 Japan .
2134910 5/1990 Japan .

OTHER PUBLICATIONS

IBM Technical Disclosure Bulletin, vol. 31, No. 6 Nov. 1988, pp. 471–473.
Proceedings Due Congres Afcet, Nov. 1991, pp. 847–857.
Image Segmentation and Mathematical Morphology, Jun. 1990 Ecole des Mines de Paris, S. Beucher.

Primary Examiner—Leo H. Boudreau
Attorney, Agent, or Firm—Nilles & Nilles

[57] ABSTRACT

In order to analyze an image, a search is made, for all the minima of the image, for the dynamic of these minima. When the dynamic of these minima is small it corresponds finally to noise. If this measured dynamic is large, the minimum is regarded as being representative of a sufficiently significant irregularity in the image signal.

20 Claims, 4 Drawing Sheets

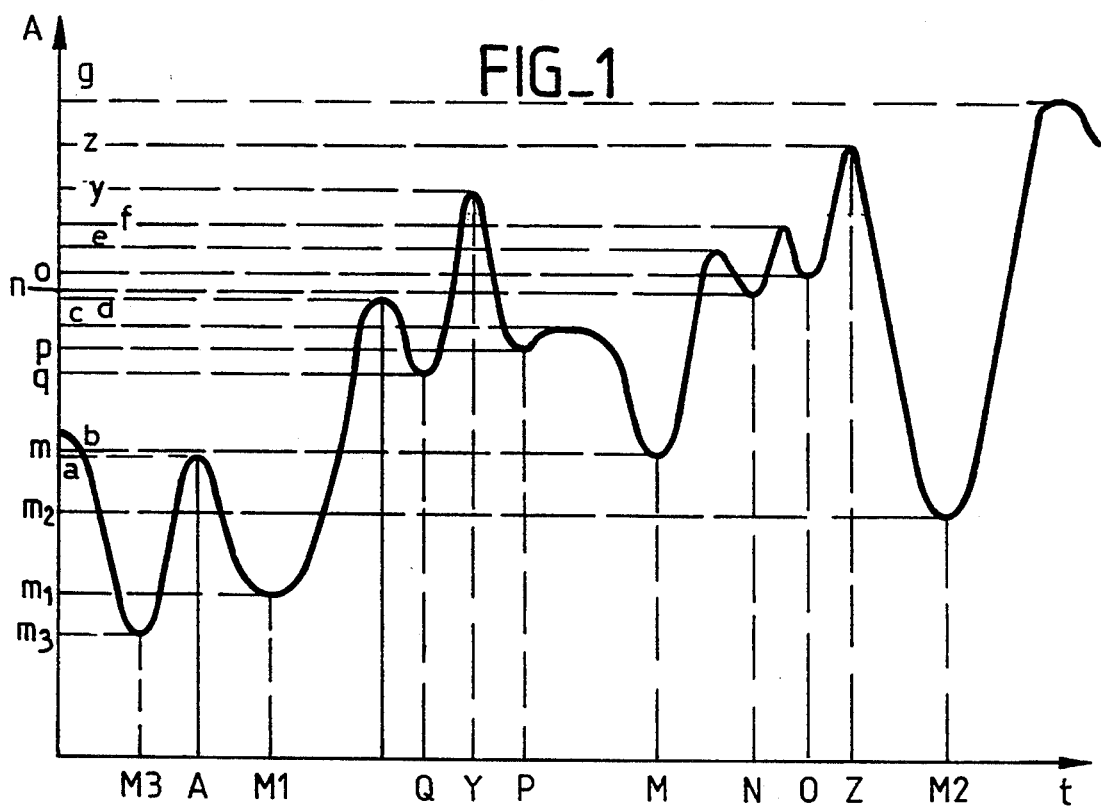
FIG_1
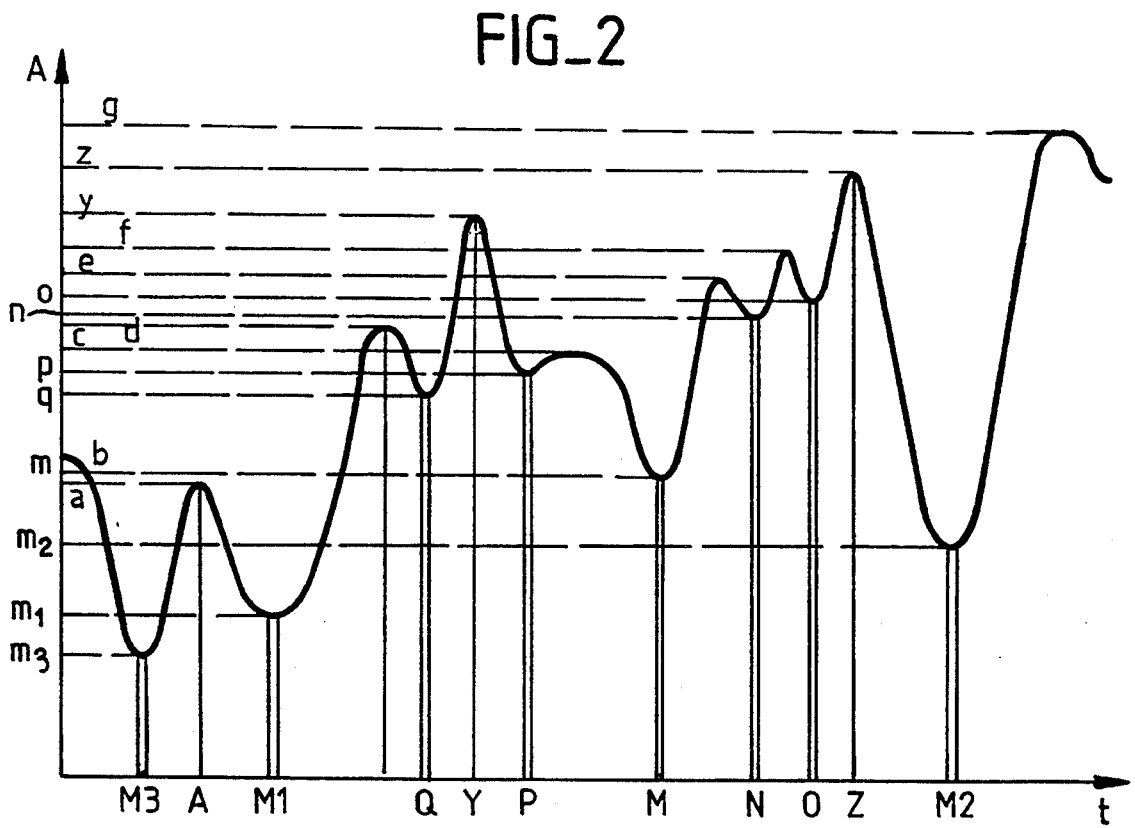
FIG_2

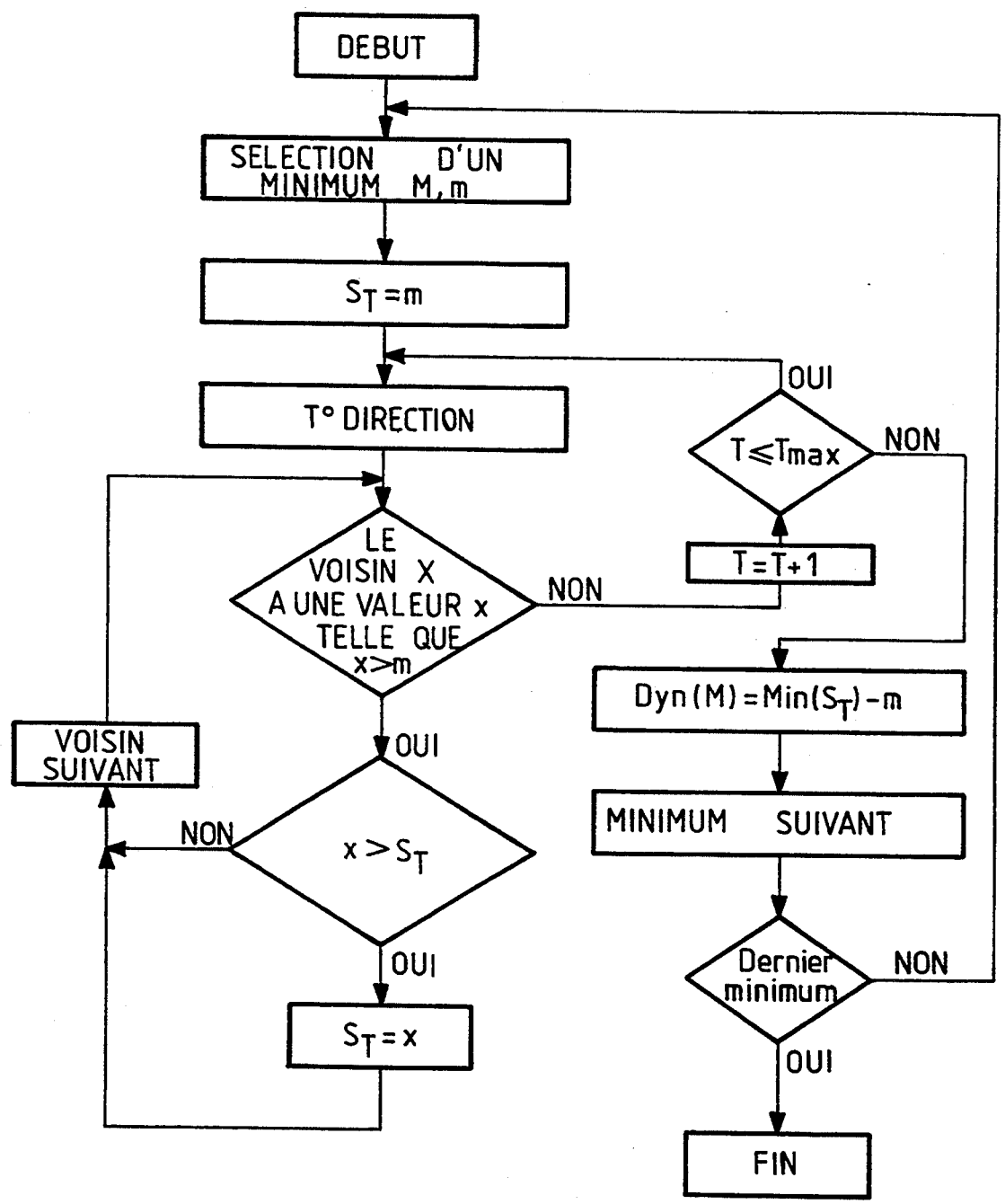

FIG_4
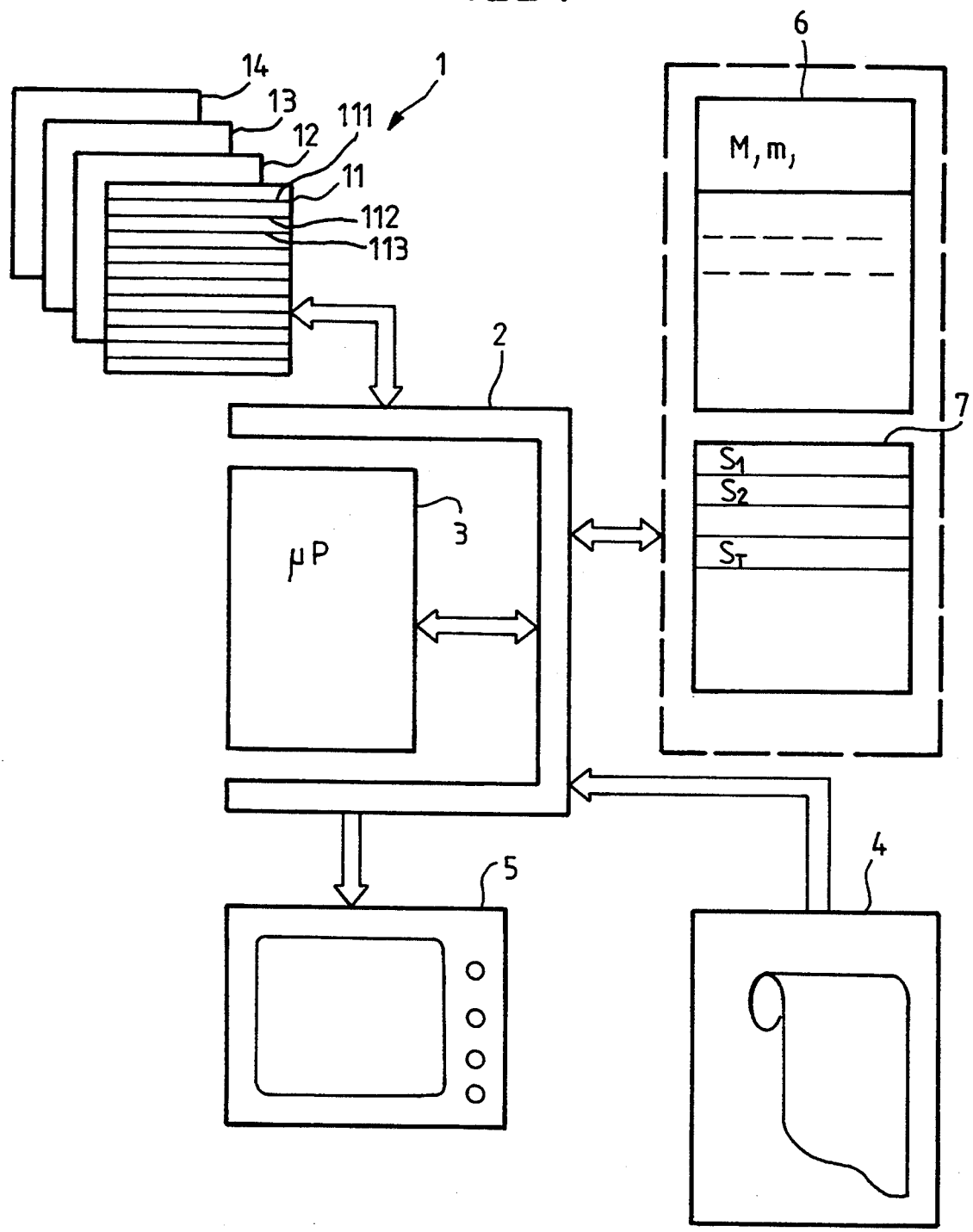

FIG_5
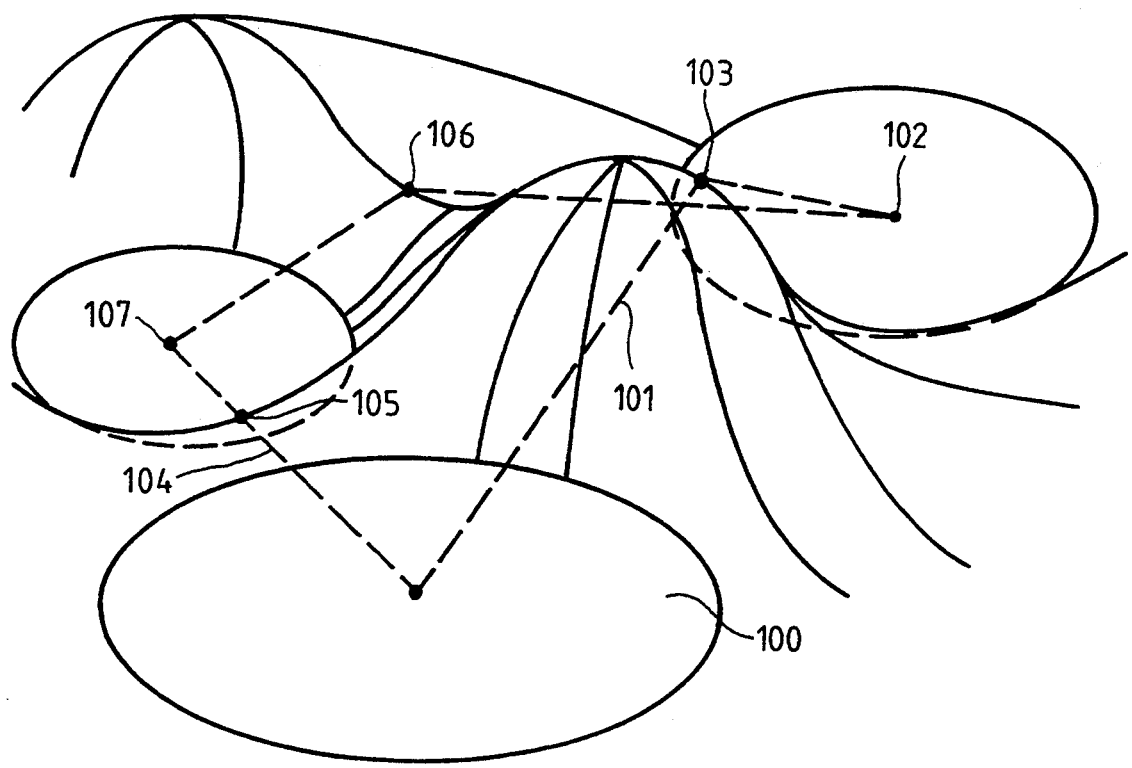
FIG_6
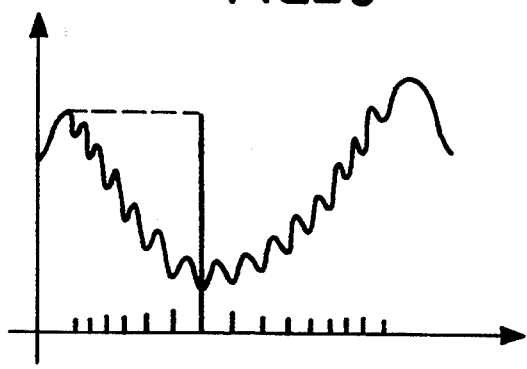

METHOD OF IMAGE ANALYSIS

BACKGROUND OF THE INVENTION

The subject of the present invention is a method of image analysis the aim of which is to improve the readability of analyzed images. It applies to the processing of all images, in one, two or three dimensions, and it is particularly useful in the medical sector. It relates however to all sectors in which images are acquired, by any means of measurement, of a physical quantity of an object studied. This measurement results in an image signal. The physical quantity may be a visible quantity, and the method then relates, for example, to images acquired with a television camera. Or else it may be an invisible quantity, for example, the coefficient of absorption of X-rays in a tissue, but transformed into a visible quantity through processing. The images concerned will preferably be digitized images since the computer processing of such images is simpler. However, according to the method of the invention, analog processing is also possible.

One of the applications of the invention is a method of contouring objects in an image, for example with a known processing termed WATERSHED (WPL), as published in IMAGE SEGMENTATION AND MATHEMATICAL MORPHOLOGY, thesis from the Ecole des Mines de Paris, S. BEUCHER, June 1990. This uses minima or maxima selected for example with the method of the invention in a first step, for locating the objects to be contoured. These selected minima or maxima are therefore markers found automatically. Once these are located, the automatic extraction of their contour is undertaken with the WPL algorithm. The latter transformation is itself implemented successfully with the aid of a method termed processing by HIERARCHICAL QUEUES or FAH published in "An optimal watershed algorithm", Fernand MEYER, Proceeding Congress AFCET, Lyon, November 91, page 847–859, the subject matter of which is hereby incorporated by reference.

Indeed, in automatic contouring methods it is sometimes necessary to mark beforehand in the image the zones of this image which are to be delimited. This marking can be manual. It then leads to a rather impractical procedure of interaction between the operator and the processing machine. It may preferably itself be automatic. However, so as to render the marked image points, or markers, significant, the latter are determined according to the invention by comparing their dynamic with a threshold.

In another application, the invention serves to locate in an angiograph image the presence of vessels for the purposes of filtering. It is thus sought to eliminate therein weakly contrasted structures which do not represent vessels. Other applications are also possible. To clarify the invention, and to give a complete explanation thereof, it will be described in the context of the angiogram application.

The main defect of images is materialized through the presence of noise. The result of noise is to bring about an alteration in the value of the signal of the image at each point of the image. This alteration follows a statistical law. The alteration can be positive or negative. One of the characteristics of noise is that it is incoherent. The alteration at an image point is thus uncorrelated with the alterations of the image signal at a neighboring point in the image. This incoherence has induced an image processing aimed at eliminating the noise. This processing is a processing through which, in principle, the image signal at a point of the image is replaced by a combination (for example an average) of the signals in image points neighboring this point. This processing is equivalent to a spatial filtering.

Such a spatial filtering has a disadvantage inherent in its principle. In effect, it blocks out the presence of small structures since the image signal from these small structures is damped by the image signal from the structures which neighbor these small structures. In the end they disappear. This is particularly awkward when, for example in detecting cancer of the breast, it is attempted to reveal the presence of microcalcifications inside a tissue. The image signal of these micro-calcifications is then averaged with the neighboring tissue image signal. As a result, it is no longer seen.

To resolve this problem in another way, an attempt has already been made to replace the spatial filtering by a contrast processing in which all the minima or maxima of the image signal are plotted. A minimum or maximum in the image signal is a value of the image signal corresponding to a particular place in the image. By extension, this place is then itself said to be a minimum or a maximum of the image. For this particular place in the image, all the directly neighboring image points contiguous with this point have image signals whose value is larger (or smaller in the case of a maximum). A minimum (or a maximum) can also be a set of neighboring points, of equal image signal value, and such that every neighbor of this set has an image signal whose value is strictly greater than (respectively less than) that of the image signal of the points of the set. This set of neighboring points of equal signal value is called a plateau. An image point is regarded as a direct neighbor of another image point when no intermediate points can be found between this point and its direct neighbor. In the case of digitized image signals, the neighboring samples of the signal refer of course to neighboring image points. A maximum in the image signal corresponds, under the same conditions, to a place in the image where all the direct neighbors have smaller image signals. Such a contrast processing is unfortunately ineffective since it sets on an equal footing the alterations in the image signal resulting from noise and the modifications of this signal resulting from the presence of structures which it is desired to show.

In the remainder of this description, for simplicity a video signal will be presented—an analog television line. The principle of the processing operations of the invention will be explained for such a signal. This processing will then be applied to a two-dimensional image. Finally, by explaining the digital processing of such an analog signal, a generalization thereof to three dimensions will be presented.

In a television signal, which will be described as a monochrome signal for simplicity, a temporal change (related to a spatial description of a line) is observed in a luminance signal. This luminance signal has minima and maxima. In order to locate them, it is possible to inspect, for each point, or rather for each plateau, whether the two neighbors at the ends of the plateau have lower or higher luminance values. If this is the case, the point is said to be a maximum (or a minimum). For a two-dimensional image, an analogous procedure can be undertaken and a luminance value will be tested of all the points on the boundary of the plateau. Other solutions for locating maxima (or minima) exist as for example that which consists in making a digital geodesic reconstruction. This technique is also published in the first article cited. This step will not be detailed insistently, since all the methods lead to the same result.

OBJECTS AND SUMMARY OF THE INVENTION

These methods lead unfortunately only to the locating of the maxima (or minima), and they do not serve to qualify them. In the invention, in order to evaluate the contrast of structures corresponding to these maxima or minima, for example to qualify maxima or minima as representing either noise or sought-after structures, the idea was developed of measuring the heights of these maxima, or the depths of these minima. These measurements are later compared with a threshold. When the absolute values of these measurements are below the threshold, the corresponding maxima or minima are considered as representing noise. In the opposite case, they are retained as indices pointing to structures to be identified.

The novelty in the invention appertains to the type of measurement carried out. The depth of a minimum will thus be equal, preferably, to the minimum difference between, on the one hand, the luminance value of the minimum studied and, on the other hand, the luminance value of the point with greater luminance which lies on a path which allows access to a point with a smaller luminance signal than that of this minimum. This new measurement of difference, or of height, is called the dynamic. These measurements are later compared with a threshold. When the measurements are below the threshold, it is concluded that the maxima or minima represent noise or at least structures with weak contrast. In the opposite case, the minima or maxima are regarded as indices pointing to structures with strong contrast. This measurement thus makes it possible to select structures by a contrast criterion.

When it is sought to use this definition of depth to eliminate the maxima or minima due to noise, the determination of the value of the threshold is itself related to a noise of determination which is accepted. Indeed, the higher the threshold, the more noise is eliminated and the less structures are seen. It has been found that a good value of threshold could correspond to a measurement of the average of the noise at the site of the measurement.

Several techniques can be adopted for measuring the height of the maxima or the depth of the minima. It has however been noted that the preferred technique would make it possible to locate the presence of these maxima or minima at any site in the image without being influenced moreover by the fact that the image signal in the vicinity of these maxima or minima is itself globally large or small in absolute value. In order to further simplify the explanation of the invention, this explanation will be limited to searching for the depth of the minima. However it should be clearly understood that, by duality, it applies also to searching for the height of the maxima.

In the preferred technique, a start is made by searching for a minimum. The first one found in the video signal is taken for example. Starting from this minimum, the neighbors are explored in a first direction. Exploration is stopped when, in this first direction, a point is found the image signal of which is lower than the image signal of the minimum from which the start was made. Hence, for this minimum and for this first direction, the maximum difference encountered between the value of this image signal at the minimum and the value of the image signal of the points thus explored is retained as depth. For a line video signal, the other direction, in the other sense, is explored later. Another difference maximum is then found for this other direction. Finally, the minimum of these two difference maxima found is retained as depth of this minimum, and we then speak of the dynamic of the minimum.

Rather than stopping the exploration when a point has been found whose image signal is less than that of the minimum from which the start was made, it is possible to stop two or three minima further on. Or else, it is possible to stop when the difference itself becomes greater than the fixed threshold. It is also possible to retain as a dynamic, the maximum of the maxima differences, or indeed the difference placed second, etc. It is even possible to limit the vicinity to an nth maximum encountered starting from the minimum studied. In all cases, the image is explored in this way over a neighborhood whose dimension is not fixed geographically but whose size is related to the more or less contrasted change in the image signal. Then, in this neighborhood, there is allocated to the minimum studied, a dynamic dependent on the value of the image signal at this minimum and at a point characteristic of this neighborhood. This approach is begun again, of course, for all the minima.

A similar definition holds of course for the search and quantization of the maxima. It is possible to use the dynamic formulated according to the principles of the invention in order to differentiate extremes associated with objects from those due to noise. However, it is also possible to use it to discriminate any objects from one another with contrast criteria.

The subject of the invention is therefore a method of image analysis, which comprises the following steps:
the minima or maxima of a signal of the image are located;
a signal dynamic, dependent on the environment of the image points corresponding to these minima or maxima is measured for these minima or maxima,
from these minima or maxima are extracted those whose dynamic is greater than a threshold, and
the image is analyzed as a function of the list of image points corresponding to the minima or maxima extracted.

The remainder of the analysis is conventional. It will not be detailed here. In an example, this analysis results in a contouring as indicated above.

BRIEF DESCRIPTION OF THE DRAWINGS

The invention will be better understood on reading the description which follows and on examining the figures which accompany it. The latter are given merely by way of non-limiting illustration of the invention. The figures show:

FIG. 1: the principle of the quantization of the minima and maxima of a video signal (in a one-dimensional example);

FIG. 2: the above principle applied to a two-dimensional image;

FIG. 3: the flow chart of the sequence of operations required to achieve the quantization of the dynamic;

FIG. 4: the basic diagram of the computer means required to implement the invention;

FIG. 5: a more precise representation relating to the nature of the paths along which the minima or maxima are sought;

FIG. 6: a representation of the effects of the processing of the invention.

DETAILED DESCRIPTION OF THE PREFERRED EMBODIMENTS

FIG. 1 represents the principle of the quantization of the minima (or maxima) of a video signal. The explanation will, firstly, be given with reference to such an analog video signal although, as was explained earlier, the processing will preferably be done digitally. The video signal represented has an amplitude measured on an axis A and changes with time t. This video signal passes through a set of minima denoted respectively and successively in time $M_3$ $M_1$ Q P M N 0 $M_2$. The values of the image signal, of the video signal, at the site of these points respectively take the values $m_3$ $m_1$ q p m n o $m_2$. This signal also encounters maxima, some of which are indicated, the maxima Y and Z, and the values of which progressively take values a, b, c, d, e, f, g and, at the points Y and Z, the values y and z.

According to the invention, a start has already been made by locating all the minima (or maxima) of the image signal. This locating is for example carried out by comparing, for each point, the image signal with that of its two neighbors. When a plateau is involved, the value of the signal of the points of the plateau is compared with the value of the signal of the neighbors of the two ends of the plateau. If the signal values of the neighbors are strictly higher, it is known that a minimum is present. Similarly, if the two neighbors have strictly lower values, the plateau is a maximum. Or else, it is possible to locate the change of sign of the derivative of this image signal by passing it through a filter of high pass differentiator type. In this way $M_3$ $M_1$ Q P M N O $M_2$ have therefore been located.

The dynamic of each of these minima will now be estimated. In a preferred manner, according to what was indicated earlier, for each minimum a search will be made for the neighboring minimum whose value of image signal is lower than the value of the image signal of the minimum studied. For example, if the minimum M is studied, the value of the image signals of the minima P and Q is not less than that of M. On the other hand, the value $m_1$ of the image signal of the minimum M1 is less than it. In a direction, here going backwards in time, the neighborhood determined according to the invention for M is thus the set of points included between M and $M_1$. A same discrimination is performed in the other direction, in the sense of increasing times of the video signal. After the minimum M, the minima N and O (the value of whose image signal is greater than the value of the image signal of M) are encountered, and then the minimum $M_2$ value $m_2$, the image signal of which is less than that of M. On the right, the neighborhood of M is therefore bounded by $M_2$.

The set of neighbors of M is therefore in the present case the set of image points included between $M_1$ and $M_2$. In each direction, the maximum of the image signal included in the neighborhood is located. In the sense in which time goes backwards, this maximum is attained at the image point Y and the value of this signal equals y. By running time in the increasing sense, this maximum is attained at the point Z and the value of the corresponding image signal is z. In an example, it has been stated that there would be retained as characteristic point of the minimum (M), for the set of exploration directions, (here the directions of advancing time and reversing time), the maximum (Y) of the neighborhood whose signal value is less than the signal values of the other maxima of the other exploration directions. Or indeed, a maximum is retained for each direction of exploration (here, Y and Z corresponding respectively to the directions of advancing time and reversing time). In an example, it has been stated that, among these maxima, the maximum with the smallest value (minimax) is preserved: the minimax Y in the present case. In other words, here the characteristic point is Y and here the dynamic of the point M is equal to y-m. Indeed, Y is the highest point in the left-defined neighborhood, Z is the highest point in the right-defined neighborhood, but Y is lower than Z.

It is seen that the neighborhood has no predetermined geographical dimension and that the manner of defining it is arbitrary. It has no determined geographical dimension since the distance which separates the point $M_1$ from the point M is completely random and depends only on the contrast of the image itself. It is not therefore imposed through a filter of specified spatial dimension. It is moreover arbitrary since instead of choosing as a limit the first minimum $M_1$ the value of image signal of which is less than the value of the image signal of the minimum studied M, the second minimum $M_3$ could have been taken, the value of the image signal of which is itself less than the first value of image signal lower than the minimum studied. It is seen that by modifying the procedure in this manner it is possible to determine a larger or smaller neighborhood. Consequently the contrast can be explored differently.

Exploring the contrast thus requires, firstly, determining the neighborhood and secondly calculating the value of the dynamic. To calculate the value of the dynamic, it has been stated that the difference y-m was retained, and it is clear that a maximum F selected by a criterion other than that proposed could have been found. For example, a difference f-m could have been retained, which would have corresponded to the first maximum F found in a direction less than the smallest y of the maxima measured over the set of directions. Finally, any definition of the dynamic according to the invention is acceptable from the moment it conforms with the notion of a neighborhood determined as a function of contrast and the notion of a difference between a maximum and the minimum studied. The neighborhood is determined through the relation between the grey levels of the successive points in each of the directions and the grey level of the minimum. In each of the neighborhoods, the maximum of interest is determined through a criterion which may be, for example, the maximum of highest value in the neighborhood.

In a video signal, it is clearly easy to determine two directions of exploration. In two-dimensional images, those which are seen most often, the number of directions of exploration is very large. Around a minimum, all the radii of a circle are thus directions of exploration. The basic diagram shown in FIG. 1 is not transposable as it is, although the spirit thereof will be preserved. Moreover, the radii of a circle, despite their infiniteness, will be only some of the directions to be explored. Indeed, the directions of exploration are not necessarily straight. The notion of neighborhood must be extended. Indeed, in a two-dimensional image, there is no longer a unique path between two points: all the curved or broken lines Joining the two points are acceptable. For example, FIG. 5 shows, starting from a catchment area 100, a straight direction of exploration 101 (plan view) may terminate in a catchment area 102. The direction 101 culminates at a high altitude 103. On the other hand, if a non-straight path 104 if exploration is taken passing through saddle points 105 and 106 and through an intermediate catchment area 107, the highest altitude encountered is that of one of these saddle points 105 or 106. According to what was stated earlier, the altitude of the highest saddle point will be retained for calculating the dynamic. This latter altitude will lead to a smaller dynamic than had the altitude 103 been retained. It will be shown subsequently how the FAH processing algorithm chosen makes it possible to take into account in a preferred manner the existence of these saddle points. Nevertheless, another definition of the mode of exploration could also be accepted, by for example accepting only the straight directions.

A profile of a topographical landscape has been represented schematically in FIG. 2. This profile is in every respect similar to the video signal of FIG. 1, to improve understanding. This landscape is liable to be flooded from a source injecting liquid from a plane containing the abscissa axis. Thus, there is a small pipe able to propagate, from the bottom, a flood towards each minimum.

Firstly, to perform this type of operation, all the minima of the signal of the image must therefore be located. For this purpose, all the image points are taken, one after the other, and the value of their image signal is compared to those of their neighbors or to that of the neighbors of the boundary of the plateau in the case of a plateau. In a two-dimensional image, the direct neighbors of an image point, with given abscissa and given ordinate, are points whose abscissae and/or ordinates differ from the abscissae and ordinates of the chosen point by one unit. It is therefore easy for each of the points of an image to have available the map of its direct neighbors. For all these direct neighbors, it is likewise possible to ascertain whether they have an image signal value lower than the value of the image signal of the point studied, or higher, or else lower for certain of these points and higher for others. In the first case, the point studied will be said to be a maximum, and in the second a minimum, and in the third neither the one nor the other. In the case of a plateau the procedure is slightly more complex. All the points neighboring the boundary of the plateau must be considered. If all the neighbors of the plateau are of higher altitude, the plateau is a minimum. If all the neighbors of the plateau are of a lower altitude, the plateau is a maximum. It is therefore simply possible to determine the list of points which are minima (or maxima) of the image.

FIG. 2 represents a section, taken along one dimension, of such an image signal representing the landscape. The amplitude A is not necessarily a geographical altitude. It may equally well be a luminance value and thus represent any physical parameter measured in a body under study. Once the list of minima M3 to M2 is known, each of the points of this list is arrayed in a so-called hierarchical queue FAH, of the type described in the article cited above. To array the points in practice, the addresses (corresponding to the coordinates of the points of the image) are arrayed in queues. Each point address is arrayed in a queue which corresponds to the value of the image signal of the point. There are as many queues as possible values for the signal. These queues are arrayed relative to one another according to the increasing value of the signal which they represent when working on the minima and according to the decreasing value of the signal when working on the maxima.

The hierarchical queue then possesses, in its first queue, a point for which the value of the image signal is smaller than all the minima of this image signal. It is the first point which must be extracted from the queue. For this point, here for example the point $M_3$, a search is made for its direct neighbors. The same approach as that which enabled the minima to be determined is used to search for its neighbors. In a two-dimensional image, it is thus possible to determine eight points situated on the medians and the diagonals of a square surrounding the point $M_3$ under study. These eight points are introduced into the hierarchical queue, each at a hierarchical level which corresponds to its image signal value. In a two-dimensional image, other neighborhood relations can be defined, and one point will have, for example, four or six neighbors. There will be six for example if the grid around the point is hexagonal. The type of neighborhood has no influence on the principle of the algorithm which remains identical whatever the number of neighbors considered. In the same way, in a three-dimensional image, it will be possible to define neighborhood relations with for example 26 neighbors. Indeed, if the image is an image in three dimensions, each point has 26 neighbors. Under certain assumptions, the number of neighbors studied can be limited to less than 26.

The neighbors are therefore inserted into the queue, and they are moreover given, at this time, a label "$lm_3$" showing that they have been inserted into the queue due to their neighboring the point $M_3$. This insertion is however conditioned by the fact that these points have not already been inserted therein with the label "$lm_3$".

Allocating them a label amounts to imagining that an attempt has been made to flood the landscape of FIG. 2 from the underground source and that the points neighboring $M_3$ are thus the first ones inundated. They are as it were wetted by the liquid from $M_3$.

By explaining the process in the manner described above, it is seen that there is a clearly understandable equivalence between the computer processing required, and what occurs in the simulated flooding. The points are gradually extracted from the hierarchical queue and of course the neighbors of $M_3$, which were inserted into this queue at low hierarchical levels, since their signal level is itself low, will be the first ones extracted before, for example, having to extract the point $M_1$.

Each point extracted enters its neighbors into the queue unless they are already there or have been there. Indeed, if a point has already been flooded, it is not necessary to flood it again. For this purpose, the memory word allocated to each point inserted into the FAH is provided with an indicator I. This indicator I, which differs from the label, is set at a certain value, for example the binary value 0, for all the points before the start of flooding. During the first insertion of the points into the FAH, the indicators of the points change value, they take for example the binary value 1. Subsequently, the reading of this indicator, for each point, prior to inserting this point into the FAH, makes it possible to not reset it therein again if the label for which it ought to be reset therein is the same as that which this point already possesses. In our example, all the image points for which the value of the image signal is less than $m_1$ receive a label "$lm_3$".

When all the points with signal value strictly less than $m_1$ have been flooded (extracted from FAH), the minimum $M_1$ and all the points with a signal value equal to $m_1$ will be extracted in turn from the FAH before flooding their as yet unflooded neighbors. Then, the points whose value is greater than $m_1$ and less than $m_2$ will progressively receive the labels "$lm_1$" or "$lm_3$" depending on whether their insertion into the queue was caused by their belonging to the neighborhood of $M_3$ or of $M_1$. This phenomenon is continued until, both in the queue and at flooding level, the signal level $m_2$ is reached. In this case, a third family of points is created which possesses the label "$lm_2$" alongside the points now possessing the labels "$lm_1$" and $lm_3$".

The level continues to rise. This means that we continue to array the neighbors of $M_1$, $M_2$ or $M_3$ in the queue and to extract them in tandem until reaching the point A which must in turn be placed in the queue, for example, because it neighbors a point flooded by the sheet coming from $M_1$. The point A therefore receives, in addition to its image signal value a, a label "$lm_1$" showing the cause of its insertion into the hierarchical queue. However, the point A, being on the boundary between the catchment area $M_3$ and the catchment area $M_1$, will again be injected into the queue since it neighbors one of the points of the catchment area $M_3$ when this point of the catchment area $M_3$ is itself extracted. A is a maximum, but this is not necessarily the case in a two- or three-dimensional image. Indeed, in a two-dimensional image, there is a multitude of paths (sequences of neighboring points) which lead from a point (the minimum under study for example) to another point (a minimum of lower altitude for example). Among all the possible paths, one is of interest: this is the one the maximum of which is the lowest (known as a "minimum maximorum" image signal). It is in fact through it that the flood propagates in practice. The sheets emanating from the two minima enter into contact at the site of the summit of this path. A can thus be a saddle point such as 105 or 106 in FIG. 5.

At the time at which the point A must again be injected into the queue, so as to receive now the label "$lm_3$", for example, a conflict is noted since the point A already possesses the label "$lm_1$". At this stage it is possible to calculate the dynamic of the minimum $M_1$. Indeed, given that $M_1$ has an image signal greater than that of $M_3$, the dynamic of $M_1$ can be calculated. This dynamic is quite simply equal to $a-m_1$. According to what was indicated earlier, the dynamic $a-m_1$ is evidently the difference between the image signal (a) corresponding to the smallest of the maxima (A) neighboring the minimum $M_1$ under study and the value of the image signal $m_1$ at this minimum under study. It is seen that the flooding technique, and the studying of neighborhoods, indicated above, make it possible to immediately ascertain all the directions of exploration, since, in this instance, the neighborhood is not necessarily a one-dimensional neighborhood but is a two-dimensional neighborhood. The list of neighboring points inserted into the queue serves as mode of exploration in all directions simultaneously.

At the time of the exploration, when a point is extracted from the hierarchical queue, its neighbors are reentered therein taking care that these neighbors have not already been entered into the queue, with the same label. If they are called upon to enter therein with the same label, they are not entered. If they are called upon to enter therein with a different label, at that time it is detected that they are boundary points.

The foregoing describes one technique for detecting particular points. There are others. For example, at the time a point X is reentered into the FAH, it is possible to carry out only the test checking whether it is not already there. Later, when this point is removed from the queue, an inspection can be made for flooded points with different labels in its neighborhood. If such is the case, this point is then determine to be a boundary point, and it is then possible to calculate the dynamic of one of the minima feeding the sheets entering into contact as explained earlier.

Once a conflict occurs, after extracting the point A for example, all the flooded neighbors of the point in conflict (the flooded neighbors of A and the flooded neighbors of the flooded neighbors of A) receive the label of the deepest minimum: here the label "$lm_3$", that of $M_3$ and not that of $M_1$. In our example all the points having received the label "lm" get assigned the label "$lm_3$". This method enables the flooding to be continued in order to calculate the dynamic of the other minima whilst no longer taking into account the minimum $M_1$ whose dynamic is now known. In our example, during the flooding, the following conflict will emerge when the sheets emanating from the minima P and M enter into contact. The dynamic of P will be calculated (since this minimum has a signal value higher than that of the minimum), and the flooded points having the label "lp" will take the label "lm". The flooding continues and the sheets emanating from $M_3$ and Q will enter into contact and it will then be possible to calculate the dynamic of Q. This is repeated until the entire relief is flooded.

The concept of flooding is a processing of known type and hence easily implemented. It is used for example to calculate the watershed (WPL) according to the second article cited above. In the invention, the conflicts are handled differently when two sheets enter into contact. For the WPL, the two sheets having entered into contact continue to flood their as yet unflooded neighbors, without the sheets mixing or absorbing one another. This method makes it possible to calculate the catchment areas associated with the minima. In the invention, when two (or more) sheets enter into contact, only the label of the sheet whose minimum is deepest is preserved. The others take no further part in the flooding procedure. And the dynamic of their minimum is calculated.

Once the dynamic is known for each of the maxima or minima, they can be sorted by comparing the dynamic for each maxima or minima to a threshold and determining whether the dynamic is less than or else greater than the threshold. If it is less than a threshold, it is understood that it will likely be synonymous with a small variation in contrast with respect to its surroundings and that consequently it will be possible to eliminate these points as non-characteristic of the physical phenomenon under study and which it is sought to show. The threshold which can be retained is preferably that which corresponds to noise. The latter can be measured throughout the image or else locally. In its principle, it includes the averaging of the image signals and the summation of the absolute values of the differences between the image signals and their average, image point by image point.

Thus to reconstruct a threshold, the following action is preferably taken. The signal is filtered with a spatial filter, the nature of whose dimension is to make the small structures disappear and reveal the large structures. The signal thus filtered is next subtracted from the original signal and the measurement noise is thus evaluated. The value of this measurement noise is measured locally and use is made of it locally as a threshold value for comparing this threshold value with the dynamics of the maxima or minima detected. Thus, from one image site to another, the threshold value will be used to determine whether a maximum or minimum representing a point characteristic of the image can be modified locally. This makes it possible in particular to take account of the effects of non-linearity in the revealing of the contrast in radiographs.

FIG. 3 shows a flowchart which can be used to implement the method described schematically in FIG. 1. After a start during which all the minima are located following the generation of image signals, a minimum M with signal value m is selected. All the possible directions T of change of this signal are explored one by one. In each of these possible directions, a search is made in the course of a first test as to whether a point X neighboring a current point under study has a signal value x such that x is larger than m. If such is the case, we investigate whether x is greater than a current threshold ST. If this test is satisfied, ST is given the value x. This is the case at the start since this current threshold ST has been chosen precisely equal to the value m. This test is done on all the successive neighbors for as long as a signal less than x is not found. The successive neighbors of course include the neighbors of the neighbors and so on. Thus, for the direction going from M to $M_1$, the value ST assigned to this direction is equal to y. When a direction has been explored, another direction is explored, as long as they have not all been explored. Once all the directions have been explored, when T is equal to or greater than Tmax, the dynamic of the point M is determined as being equal to the minimum of the chosen values ST less the value m of the minimum M under study. This undertaken, the same is done for the next minimum in the list of minima formulated at the start and so on.

FIG. 4 shows all the hardware which can be used to implement the method of the invention. An image memory 1 includes a certain number of memory pages 11, 12, 13 and 14 each provided with a certain number of lines of image points, such as 111, 112, 113, etc. This image memory 1 is interfaced via an exchange bus 2 with an arithmetic and logic unit 3 which implements a program contained in a program memory 4. The program memory 4 is also interfaced with the arithmetic and logic unit 3 via the bus 2. Display means 5, also connected to the bus 2, enable the images processed by the unit 3 to be displayed. According to the invention, the list of minima M associated with the value m of their image signal, as well as the measurement of their dynamic, is stored in a memory 6. The values of the maxima ST corresponding to the various explorations undertaken can also be stored in another memory 7.

In the subsequent processing of the image, the memory 6 is used to constitute a store of image markers. In one application, it is sought to surround with an image processing method of the WPL type, these markers in order to delimit their zone of influence.

What is claimed is:

1. A method of image analysis, which comprises the following steps:
 generating a signal of an image;
 locating the minima points of the image signal;
 determining a signal dynamic, for each of the minima points, which is dependent on the environment of the points neighboring the minimum point and which is constituted by the difference between the image signal value at the minimum point and a minimum maximorum image signal value for the neighboring points;
 extracting those minima points whose dynamic is greater than a threshold; and
 analyzing the image as a function of the list of points corresponding to the minima points extracted.

2. The method as claimed in claim 1, wherein each of the steps of determining a dynamic includes determining a dynamic for a minimum, and wherein each step of determining a minimum includes
 determining a neighborhood which is delimited by the points corresponding to a given change in contrast of the image, and
 measuring the difference of the signal of the image between the minimum and a point characteristic of the corresponding neighborhood.

3. The method as claimed in claim 2, further comprising the steps of
 for a given change in contrast, searching for image boundary points the value of whose image signal is less than that of the minimum, and
 retaining, as the neighborhood, intermediate points situated between the minimum and the boundary points.

4. The method as claimed in claim 2, further comprising
 choosing, as a point characteristic of the neighborhood, a point possessing, in a direction, a larger image signal than all the other points of the neighborhood in this same direction,
 searching for points which are similar to said point and which have the same properties in other directions, and
 choosing, among said similar points, the one point which has the smallest image signal as a characteristic point.

5. The method as claimed in claim 2, wherein the step of determining the dynamic includes
 (1) giving, to each point corresponding to a minimum of the image signal, a label representative of the respective minimum,
 (2) arraying all the image points corresponding to said minima in a hierarchical queue,
 (3) extracting said points corresponding to said minima from the hierarchical queue, beginning with the smallest in value,
 (4) reentering the points that were the direct neighbors of the points extracted from the hierarchical queue at the time of extracting these points, if said direct neighbors are not already in the queue,
 (5) allocating, to the points entered into the hierarchical queue, a label identical to that of the point whose neighbors they are and whose extraction from the queue caused their entry, and
 (6) designating as a dynamic at said first minimum, the difference between the value of the image signal at said first minimum and the value of the image signal at a point having to be entered into the queue with the label of said first minimum as well as with the label of a second minimum but the value of whose image signal is smaller.

6. The method as claimed in claim 5, wherein the step of determining the dynamic further comprises
assigning, to the points which have received the label of said first minimum whose dynamic has just been determined, a replacement label corresponding to said second minimum whose image signal was smaller.

7. The method as claimed in claim 5, wherein the steps (3), (4), (5) and (6) of claim 5 are repeated in order to calculate in the same way the dynamic of all of the minima of the image.

8. The method as claimed in claim 6 wherein said step of assigning said replacement label comprises
creating a label correspondence table in order to allocate the label of said second minimum to the points neighboring said first minimum.

9. The method as claimed in claim 1, further comprising
contouring zones around the minima points extracted according to a method of image processing with watershed.

10. A method, comprising the steps of:
(A) generating a signal representative of an image, said signal having minima values;
(B) locating minima points corresponding to said minima values of said signal;
(C) determining, for each of said minimum points, a signal dynamic which is dependent on the environment of points neighboring said minimum point and which is constituted by the difference between the image signal value at said minimum point and the minimum maximorum image signal value for said neighboring points;
(D) comparing said dynamics of said minima points to a threshold;
(E) extracting those minima points having dynamics which are greater than said threshold;
(F) analyzing said image as a function of a list of points corresponding to the extracted ones of said minima points; and
(G) displaying said image.

11. A method as claimed in claim 10, wherein said step (C) comprises, for each minimum,
(i) determining a neighborhood which corresponds to said minimum and which is delimited the by points corresponding to a designated change in contrast of said image, and
(ii) measuring the difference, of said signals, between said minimum and a point characteristic of the corresponding neighborhood of said minimum.

12. A method according to claim 11, wherein said step (C) further comprises
(iii) assigning to a point corresponding to each of said minima, a label representative of the respective minimum,
(iv) arranging all of said points corresponding to said minima in a hierarchical queue,
(v) extracting said points corresponding to said minima from said hierarchical queue, beginning with the point having the smallest value,
(vi) reentering those points, which were direct neighbors of said points extracted from said hierarchical queue at the time of extraction of said points, if said direct neighbors are not already in said hierarchical queue, and
(vii) allocating, to the points entered in said hierarchical queue, a label identical to that of the points the neighbors of which and the extraction of which from said hierarchical queue, caused their entry.

13. A system comprising:
(A) means for generating a signal representative of an image, said signal having minima values;
(B) means for locating minima points corresponding to said minima values of said signal;
(C) means for determining, for each of said minima points, a signal dynamic which is dependent on the environment of points neighboring said minimum point and which is constituted by the difference between the image signal value at said minimum point and the minimum maximorum image signal value for said neighboring points;
(D) means for comparing said dynamics of said minima points to a threshold;
(E) means for extracting those minima points having dynamics the values of which are greater than said threshold;
(F) means for analyzing said image as a function of a list of points corresponding to said extracted minima points; and
(G) means for displaying said image.

14. A system as claimed in claim 13, wherein said extreme values comprise minima.

15. A system as claimed in claim 14, wherein further extreme values comprise maxima, two of which surround each minima, and wherein each of said dynamics comprises the difference between the signal corresponding to the smallest maximum surrounding the respective minimum and the signal corresponding to the respective minimum.

16. A method of image analysis, which comprises the following steps:
generating a signal of an image;
locating the minima or maxima of the signal of the image;
determining a signal dynamic, for each of the minima or maxima, which is dependent on the environment of the points corresponding to the corresponding minima or maxima;
extracting those minima or maxima whose dynamic is greater than a threshold; and
analyzing the image as a function of the list of points corresponding to the minima or maxima extracted; wherein
each of the steps of determining a dynamic includes determining a dynamic for a minimum, and wherein each step of determining includes
determining a neighborhood which is delimited by the points corresponding to a given change in contrast of the image, and
measuring the difference of the signal of the image between the minimum and a point characteristic of the corresponding neighborhood; and further comprising the steps of
for a given change in contrast, searching for image boundary points the value of whose image signal is less than that of the minimum, and
retaining, as the neighborhood, intermediate points situated between the minimum and the boundary points.

17. A method of image analysis, which comprises the following steps:
generating a signal of an image;
locating the minima or maxima of the signal of the image;

determining a signal dynamic, for each of the minima or maxima, which is dependent on the environment of the points corresponding to the corresponding minima or maxima;

extracting those minima or maxima whose dynamic is greater than a threshold; and analyzing the image as a function of the list of points corresponding to the minima or maxima extracted; wherein each of the steps of determining a dynamic includes determining a dynamic for a minimum, and wherein each step of determining includes determining a neighborhood which is delimited by the points corresponding to a given change in contrast of the image, and measuring the difference of the signal of the image between the minimum and a point characteristic of the corresponding neighborhood; and further comprising the steps of choosing, as a point characteristic of the neighborhood, a point possessing, in a direction, a larger image signal than all the other points of the neighborhood in this same direction, searching for points which are similar to said point and which have the same properties in other directions, and choosing, among said similar points, the one point which has the smallest image signal as a characteristic point.

18. A method of image analysis, which comprises the following steps:

generating a signal of an image;

locating the minima or maxima of the signal of the image;

determining a signal dynamic, for each of the minima or maxima, which is dependent on the environment of the points corresponding to the corresponding minima or maxima;

extracting those minima or maxima whose dynamic is greater than a threshold; and analyzing the image as a function of the list of points corresponding to the minima or maxima extracted; wherein each of the steps of determining a dynamic includes determining a dynamic for a minimum, and wherein each step of determining includes determining a neighborhood which is delimited by the points corresponding to a given change in contrast of the image, and measuring the difference of the signal of the image between the minimum and a point characteristic of the corresponding neighborhood; and wherein the step of determining the dynamic includes (1) giving, to each point corresponding to a minimum of the image signal, a label representative of the respective minimum, (2) arraying all the image points corresponding to said minima in a hierarchical queue, (3) extracting said points corresponding to said minima from the hierarchical queue, beginning with the smallest value, (4) reentering the points that were the direct neighbors of the points extracted from the hierarchical queue at the time of extracting these points, if said direct neighbors are not already in the queue, (5) allocating, to the points entered into the hierarchical queue, a label identical to that of the point whose neighbors they are and whose extraction from the queue caused their entry, and (6) designating as a dynamic at said first minimum, the difference between the value of the image signal at said first minimum and the value of the image signal at a point having to be entered into the queue with the label of said first minimum as well as with the label of a second minimum but the value of whose image signal is smaller.

19. A method of image analysis, which comprises the following steps:

generating a signal of an image;

locating the minima or maxima of the signal of the image;

determining a signal dynamic, for each of the minima or maxima, which is dependent on the environment of the points corresponding to the corresponding minima or maxima;

extracting those minima or maxima whose dynamic is greater than a threshold;

analyzing the image as a function of the list of points corresponding to the minima or maxima extracted; and contouring zones around the minima or maxima extracted according to a method of image processing with watershed.

20. A method, comprising the steps of:

(A) generating a signal representative of an image, said signal having minima values;

(B) locating points corresponding to said minima values of said signal;

(C) determining, for each of said minima points, a signal dynamic which is dependent on the environment of points corresponding to the respective one of said minima values, said determining step including (i) determining a neighborhood which corresponds to said minimum andwhich is delimited by the points corresponding to a designated change in contrast of said image, (ii) measuring the difference, of said signals, between said minimum and a point characteristic of the corresponding neighborhood of said minimum, (iii) assigning, to a point corresponding to each of said minima, a label representative of the respective minimum, (iv) arranging all of said points corresponding to said minima in a hierarchical queue, (v) extracting said points corresponding to said minima from said hierarchical queue, beginning with the point having the smallest value, (vi) reentering those points, which were direct neighbors of said points extracted from said hierarchical queue at the time of extraction of said points, if said direct neighbors are not already in said hierarchical queue, and (vii) allocating, to the points entered in said hierarchical queue, a label identical to that of the points the neighbors of which and the extraction of which from said hierarchical queue, caused their entry;

(D) comparing said dynamics of said minima points to a threshold;

(E) extracting those minima points having dynamics which are greater than said threshold;

(F) analyzing said image as a function of a list of points corresponding to the extracted ones of said minima points; and (G) displaying said image.

* * * * *